United States Patent [19]

Lukes

[11] 4,408,144

[45] Oct. 4, 1983

[54] TAPE TENSION CONTROL FOR A TAPE TRANSDUCER

[75] Inventor: Henry J. Lukes, Bellevue, Wash.

[73] Assignee: Sundstrand Data Control, Inc., Redmond, Wash.

[21] Appl. No.: 343,562

[22] Filed: Jan. 28, 1982

[51] Int. Cl.³ .......................................... B65H 59/38
[52] U.S. Cl. ......................................... 318/7; 318/41; 318/112
[58] Field of Search ............... 318/6, 7, 41, 52, 112, 318/625, 640, 77; 242/203, 75.5, 75.51, 75.52, 75.45, 67.5, 186; 360/73

[56] References Cited

U.S. PATENT DOCUMENTS

| 3,584,805 | 6/1971 | Lee | 318/7 |
| 3,587,071 | 6/1971 | Stegman | 242/75.51 X |
| 3,800,196 | 3/1974 | Zimmermann | 318/6 |
| 3,921,043 | 11/1975 | Luzio | 318/7 |
| 4,133,494 | 1/1979 | Nukui | 242/203 X |

Primary Examiner—Ulysses Weldon
Attorney, Agent, or Firm—Wood, Dalton, Phillips, Mason & Rowe

[57] ABSTRACT

A reel-to-reel constant speed tape transducer in which the torques of the reel motors are controlled to maintain the tension in the tape to the take-up reel substantially equal to or slightly greater than the tension in the tape from the supply reel. The speed of the take-up reel provides a measure of reel diameter to generate signals which control the torque of the reel motors.

6 Claims, 7 Drawing Figures

TAPE TENSION CONTROL FOR A TAPE TRANSDUCER

This invention relates to a system for controlling the tension in the tape of a tape transducer.

In a reel-to-reel tape transducer, constant tape speed past the transducer head is established by a motor driven capstan. The tape supply and take-up reels are also motor driven. For best results in maintaining constant tape speed and minimizing tape wear, tension in the tape should be kept constant. Typically the reels are driven by permanent magnet DC motors. The motor current can be controlled to control motor torque and tape tension. The diameter of the tape on the reels changes as the tape is transferred from the supply reel to the take-up reel. It is necessary to vary the torque of the reel drive motors to maintain constant tape tension.

It is a principal feature of the invention to vary the reel motor currents in accordance with tape diameter to maintain constant tension.

More particularly, the tape diameter is sensed by measuring the angular speed of the take-up reel which, since linear tape speed is constant, varies inversely with the diameter of the tape on the reel. For constant tape tension, the motor currents and thus the motor torques are controlled in direct relation to tape diameter.

Further features and advantages of the invention will readily be apparent from the following specification and from the drawings, in which.

Figure 1:
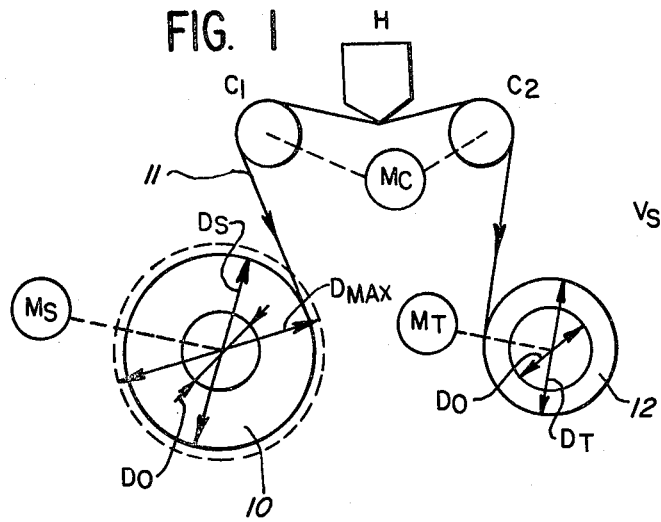
FIG. 1 is a diagrammatic illustration of a three-motor tape transducer system.

The tape transducer system of FIG. 1 has a supply reel 10 driven by a motor $M_S$ from which a recording tape 11 passes around a first drive capstan $C_1$, past a transducing head H, around a second drive capstan $C_2$ and to a take-up reel 12 driven by motor $M_T$. The drive capstans $C_1$, $C_2$ are driven at a constant speed by motor $M_C$ to move the tape 11 at a constant speed past transducer head H. As will be explained in detail below, the currents to motors $M_S$ and $M_T$ are controlled so that the motor torques are appropriate to maintain the tension in the section of tape between drive capstan $C_2$ and take-up reel 12 equal to or slightly greater than the tension in the section of tape between supply reel 10 and drive capstan $C_1$.

The dimension $D_0$ represents the minimum tape diameter of each reel. The dimension $D_S$ is the actual diameter of the tape on the supply reel while the dimension $D_T$ is the actual diameter of the tape on the take-up reel 12. $D_{MAX}$ (shown only for supply reel 10) is the maximum diameter of tape on the reel.

The reel motor torque is controlled to maintain constant tension in the tape, as a function of tape diameter. Direct measurement of tape diameter is impractical. However, as the lineal tape speed is constant, the angular velocity of each reel varies inversely with the diameter of tape wound thereon and provides a measure of tape diameter. The speed of the take-up reel is measured as a control based on the speed of the supply reel would be unstable.

Figure 2:
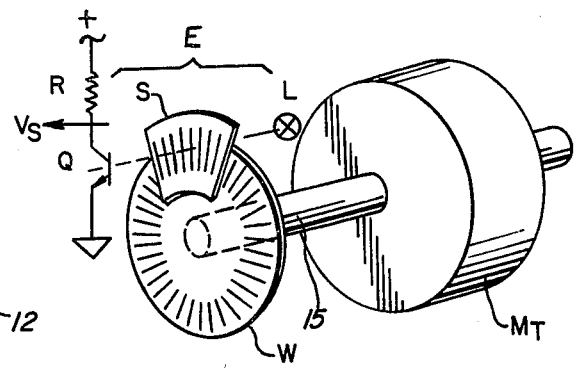
FIG. 2 is a diagrammatic illustration of the take-up reel motor and the motor speed sensing means.

FIG. 2 illustrates an optical system for measuring take-up reel speed. A transparent disc W having radial opaque lines thereon is mounted on the shaft 15 of take-up motor $M_T$. The take-up reel 12 is not shown in FIG. 2. Adjacent the rotating wheel W is a fixed mask S with opaque lines similar to those on the wheel and having the same orientation and angular separation. A light beam from source L is projected through the wheel W and mask S to a photosensitive transistor Q. As the wheel W turns, the light reaching the phototransistor Q is interrupted at a frequency related to the angular speed of the wheel. Transistor Q is connected through a current limiting resistor R across a suitable voltage source. A pulse signal VS is derived from the transistor circuit having a frequency $$mn$$

where
m is the number of opaque lines on wheel W and
n is the angular speed of take-up reel motor $M_T$ and wheel W.

The tape diameter $D_T$ is given by the relation $$D_T = V/\pi n$$

where V is the lineal tape velocity. This relation may also be expressed as $D_T = vm/\pi f$ or $C_1/f$ where $C_1 = vm/\pi$ a constant for a given tape system. The diameter of the take-up reel 12 is initially small and increases. The diameter of the supply reel is initially large and decreases. The frequency of the signal $V_S$ is initially large and decreases as the angular speed of the take-up reel decreases. To maintain the desired tension in the tape, the torque in the take-up reel motor $M_T$ is decreased as the tape diameter increases and the torque of the supply reel motor $M_S$ is increased as the tape diameter $D_S$ decreases.

Figure 3:
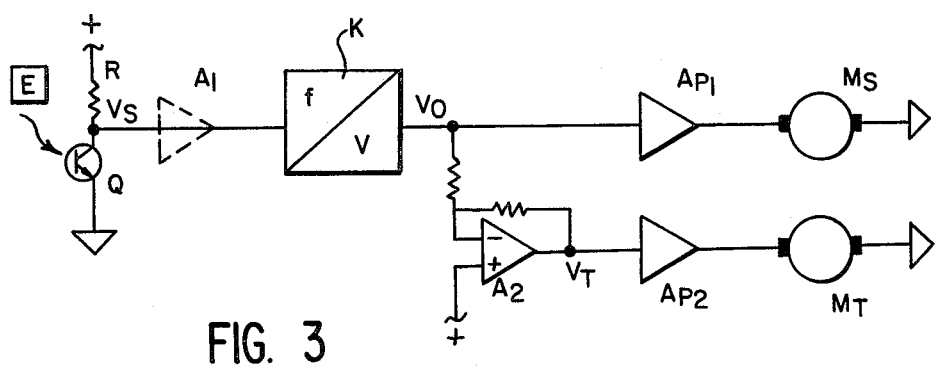
FIG. 3 is a schematic diagram of the motor torque control circuit.

A circuit for performing this operation is illustrated in FIG. 3. The signal $V_S$ from optical encoder E is amplified at $A_1$, if necessary, and connected with a frequency to voltage converter K which has at its output terminal a DC voltage $V_O$, the value of which is proportional to the frequency of $V_S$. The voltage $V_O$ is relatively high when the take-up reel 12 is empty and supply reel 10 is full. The voltage decreases as the tape is transferred from the supply reel to the take-up reel. The desired reel motor torque for the supply reel motor $M_S$ varies directly with the voltage $V_O$ and the desired torque for the take-up reel motor $M_T$ varies inversely with $V_O$ as is shown in the circuit of FIG. 3, the voltage $V_O$ is connected with a power amplifier $A_{P1}$ which drives the supply reel motor $M_S$. The voltage $V_O$ is also connected with an inverter amplifier $A_2$, the output of which is a voltage $V_T$, an inverse function of $V_O$. The signal $V_T$ is connected with power amplifier $A_{P2}$ which drives the take-up reel motor $M_T$.

Figure 4:
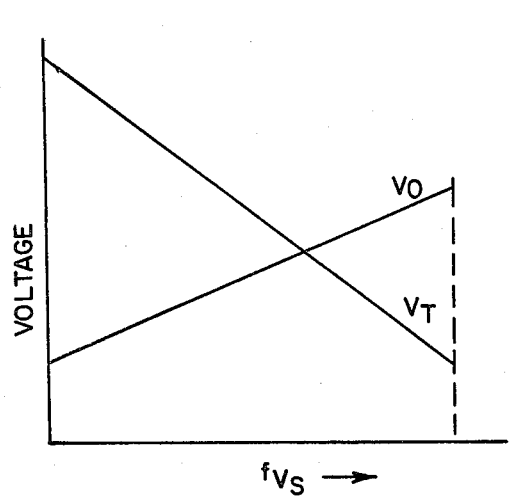
FIG. 4 is a plot of the output voltages $V_O$ and $V_T$ of the circuit of FIG. 3, as a function of frequency of the take-up reel speed signal.

The operation of FIG. 3 is illustrated graphically in FIG. 4 where the voltages $V_O$ and $V_T$ are plotted as a function of the frequency of the voltage $V_S$. Note that the frequency of $V_S$ decreases with time as tape is transferred to the take-up reel. Thus, a time scale for FIG. 4 is from right to left.

The circuit of FIG. 3 provides a torque control which approximates the desired constant tension in the tape. The tape diameters do not, however, vary linearly with the frequency of $V_S$. Accordingly, a more detailed analysis is desirable.

Figure 5:
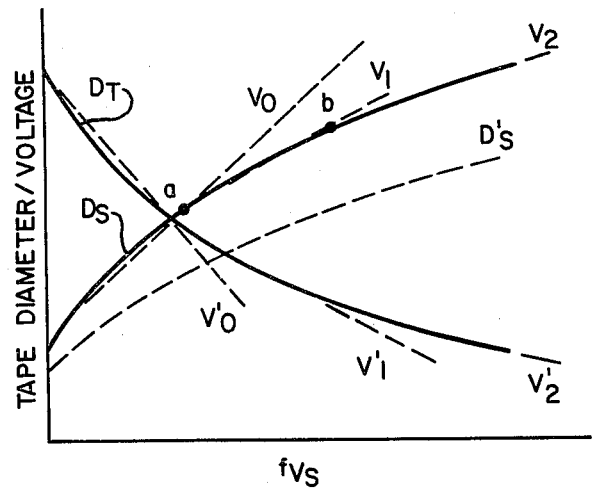
FIG. 5 is a plot of tape diameter and voltages as a function of the frequency of the take-up reel speed signal for a more accurate control of torque and tension.

In FIG. 5 the solid line curve $D_T$ is a plot of the diameter of the take-up reel as a function of frequency of the signal $V_S$ in accordance with the relationship $$D_T = C_1/f.$$

A corresponding curve $D_S$ may be derived for the diameter of the supply reel by considering that since the length of the tape is constant, the cross-sectional area of the tape on the two reels is constant. Thus, $$\frac{\pi}{4}(D_S^2 - D_0^2) + \frac{\pi}{4}(D_T^2 - D_0^2) = \frac{\pi}{4}(D_{MAX}^2 - D_0^2)$$

Rearranging this equation, $$D_S = \sqrt{D_{MAX}^2 + D_0^2 - D_T^2} = \sqrt{D_{MAX}^2 + D_0^2 - \frac{C_1^2}{f^2}}$$

The curve $D_S$ is also plotted in FIG. 5. As discussed above, the signal voltage to the power amplifier should follow the same curve as the tape diameter to maintain the desired constant tension. Thus, the curves $D_T$ and $D_S$ represent on a different ordinant scale the voltages desired for operating the take-up and supply motors, respectively.

Figure 6:
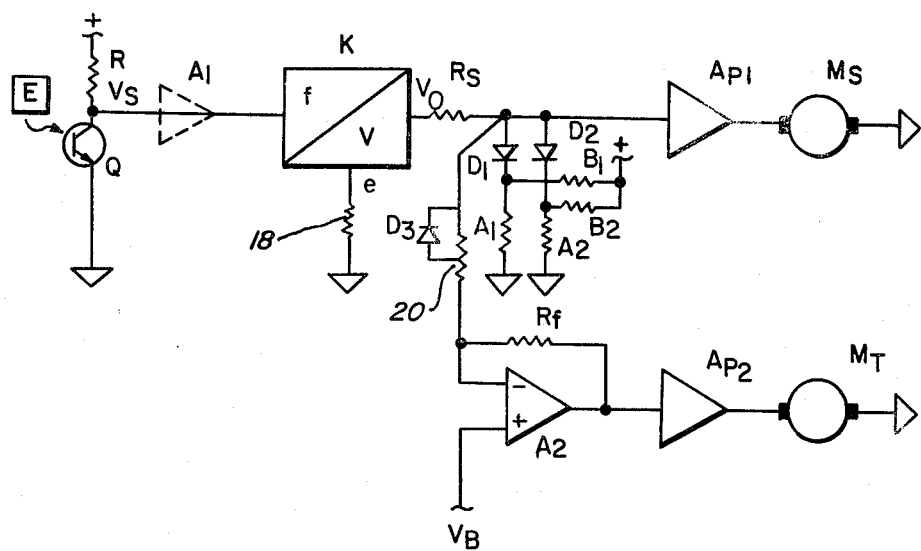
FIG. 6 is a schematic diagram of a circuit for generating the voltages plotted in FIG. 5.

In the circuit of FIG. 6, the resistor 18 connected with the scaling terminal e of the frequency to voltage converter K is selected to establish the slope of dotted line curve $V_O$, FIG. 5, to approximate the left hand segment of the curve $D_S$. To the right of the point a, the curve $D_S$ deviates excessively from $V_O$. The output voltage of the frequency to voltage converter must be reshaped to better approximate the curves $D_S$ and $D_T$. The circuit of FIG. 6 illustrates one manner of accomplishing this. A diode $D_1$ biased by a voltage divider $A_1$, $B_1$ is connected across the frequency to voltage converter output. When $V_O$ exceeds the bias on diode $D_1$ the converter output is shunted by a resistance and the slope of the output follows the dashed line curve $V_1$, closely approximating another segment of the curve $D_S$. Similarly, at the point b, diode $D_2$ conduits connecting a further resistance across the output and appropriately shaping the output voltage along dashed line $V_2$. Of course, any number of biased diode networks may be used to provide a desired agreement of the voltage to the amplifier $A_{P1}$ with the curve $D_S$.

As in FIG. 3, the voltage applied to amplifier $A_{P1}$ is connected with inverting amplifier $A_2$ and amplifier $A_{P2}$, to operate the take-up reel motor $M_T$. The dashed line curves $V'_0$, $V'_1$ and $V'_2$ illustrate the voltage segments applied to the take-up reel motor circuit.

Selection of the bias voltage $V_B$ and the voltage gain of amplifier $A_2$ adjusts the position of the output voltage for agreement with curve $D_T$. In the event the left hand section of the output curve does not have sufficiently steep slope, a further adjustment may be made by bypassing a portion of input resistor 20 by a diode D.

The DC reel motors $M_S$ and $M_T$ operate at a very low speed and their back EMF is negligible. Accordingly, it is appropriate to assume that the motor currents and thus the torques supplied to the tape reels, are proportional to the input voltages of the power amplifiers $A_{P1}$ and $A_{P2}$.

If the tape system uses brushless motors rather than DC permanent magnet motors, the output currents from power amplifiers $A_{P1}$ and $A_{P2}$ will be connected through suitable commutation circuits (not shown) with the motors.

It is sometimes an advantage if the tension in the tape between the drive capstan $C_2$ and the take-up reel 12 is greater than that in the tape between drive capstan $C_1$ and supply reel 10. The reel motors then assist the drive capstans in moving the tape. In this situation the diode-resistor networks of FIG. 6 are selected to follow the dashed line curve $D_S'$, FIG. 5, while the bias and gain of amplifier $A_2$ provide an amplifier output to follow curve $D_T$.

Figure 7:
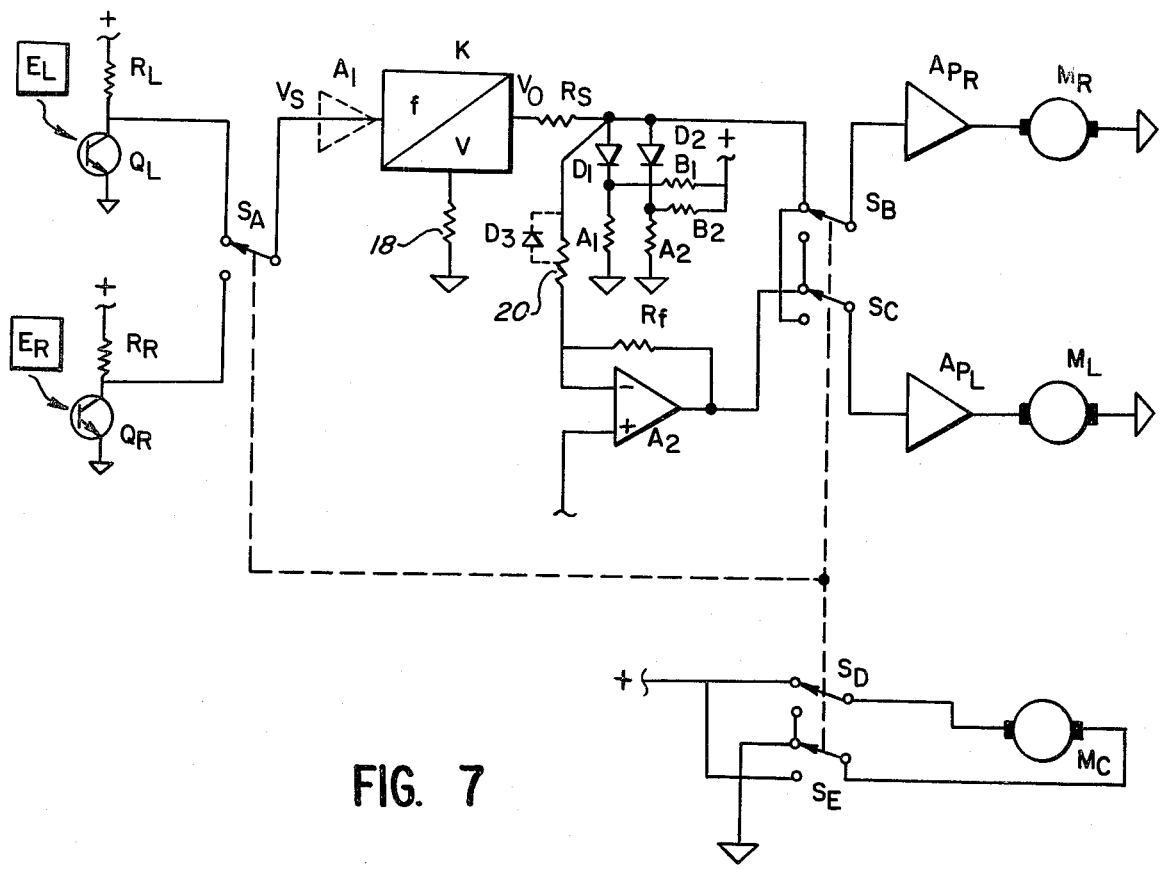
FIG. 7 is a schematic diagram of a system providing for bidirectional operation.

The system disclosed herein can be used in a reversible tape transducer as illustrated in FIG. 7 where the subscripts L and R are used to designate the left and right reels rather than the subscripts S and T for supply and take-up reels. Both reel motors have optical speed encoders. A five-section, two-position switch $S_A - S_E$ provides for reversal of the direction of tape motion. Switch sections $S_D$, $S_E$ are connected with capstan drive motor $M_C$ to reverse its direction of operation. In the position of the switch contacts shown, the system is conditioned for motion of the tape from right to left. The take-up reel speed signal $V_S$ is derived from the left hand speed encoder $E_L$ through switch section $S_A$. The output of the frequency to voltage converter K is connected through switch section $S_B$ to the right hand reel motor $M_R$ which serves as the supply reel. The inverted output of amplifier $A_2$ is connected through switch section $S_C$ to the left reel drive motor $M_L$, serving as the take-up reel. Movement of the switch to the opposite position reverses the direction of the capstan drive motor $M_C$, selects the $V_S$ from the right hand encoder $E_R$ and reverses the signals to the reel drive motors.

I claim:

1. A torque control circuit for controlling the currents of both take-up and supply reel motors of a three-motor tape recorder/reproducer, in which
    the take-up reel motor is equipped with a motion encoder which delivers an AC signal with frequency proportional to the motor speed,
    in which this signal, after amplification, is fed to the input of a frequency-to-voltage converter whose output voltage drives, via a first power amplifier, the supply reel motor,
    said signal being inverted and amplified in an additional inverting amplifier whose output voltage drives, via a second power amplifier, the take-up reel motor.

2. The torque control circuit of claim 1 in which a voltage shaping network is connected with the output of the frequency-to-voltage converter to adapt the converter output voltage to the required shape.

3. A torque control circuit for controlling the currents of both reel motors of a bidirectional two reel tape recorder and/or reproducer the two reels serving as take-up or supply reels depending on the direction of operation, in which
    both reel motors are equipped with motion encoders and the encoder outputs are connected to circuitry including a frequency-to-voltage converter by means of a switching device which is controlled simultaneously with the tape direction change to connect the output of the take-up motor encoder to the converter.

4. In a tape recording system having a transducing head, a tape supply reel, a tape take-up reel, a tape drive mechanism for moving the tape past the transducing head at a constant speed, a supply reel motor and a take-up reel motor, an improved torque control for the reel motors to maintain uniform tension on the tape, comprising:

an optical speed encoder connected with said take-up reel, having a pulse output signal at a frequency directly related to take-up reel speed;

a frequency-to-voltage converter having an input connected with said encoder having an output signal with an amplitude which is a function of the frequency f;

means for controlling the torque of the supply reel motor in accordance with the amplitude of said converter output signal; and means for controlling the torque of the take-up reel motor in accordance with the inverse of the converter output signal.

5. The torque control circuit of claim 11 including:

means for scaling the amplitude of the output signal of said frequency to voltage converter to control the torque of the supply reel motor in accordance with the expression $$\sqrt{D_{MAX}^2 + D_0^2 - \frac{C_1^2}{f^2}}$$

and for scaling the amplitude of the output signal of the frequency to voltage converter to control the torque of the take-up reel motor in accordance with the expression $$C_1/f$$

where
$D_{MAX}$ is the maximum diameter of tape on a reel
$D_0$ is the minimum diameter of tape on a reel
$C_1$ is a constant relating tape speed and frequency.

6. The torque control of claim 5 having an optical speed encoder connected with each of said tape reels; and means for reversing the tape drive mechanism and the control of the tape reels for bidirectional operation of the recording system.

* * * * *